United States Patent Office 2,696,499
Patented Dec. 7, 1954

2,696,499
PREPARATION OF TOLUIC ACIDS

Chester M. Himel, Menlo Park, Calif., assignor to Richfield Oil Corporation, Los Angeles, Calif., a corporation of Delaware No Drawing. Application July 1, 1952,
Serial No. 296,718

4 Claims. (Cl. 260—524)

My invention relates to an improved method for the preparation of toluic acids from xylenes.

It has been suggested in the art to prepare toluic acids by oxidizing xylenes in the liquid phase by means of an oxygen-containing gas, such as air or air which has been enriched with oxygen, and using a catalyst, such as a cobalt, manganese or cerium salt. In accordance with the method suggested, the oxidation is carried out with the xylene in admixture with a solvent which is inert to the oxidation and which is capable of dissolving the catalyst and the xylene, for example, carbon tetrachloride, benzene or organic carboxylic acids including acetic acid, butyric acid and the like. The use of a solvent in performing the reaction is obviously undesirable in that solvents are expensive, in that they present a serious solvent recovery problem and in that they are not in fact inert. Merely omitting the solvent from the reaction mixture of course obviates the undesirable features of solvent cost and solvent recovery, but in doing this I have found that the omission of the solvent from the reaction raises a further problem in that the reaction conditions of the suggested process must be drastically changed if an excessive quantity of phthalic acids are not to be produced in the oxidation.

In accordance with my present invention, I have discovered an improved process for the oxidation of xylenes to produce toluic acids at a rapid rate and in good yield with a minimum production of phthalic acids and without the use of a solvent. In accordance with my process, the xylenes are oxidized in liquid phase using air or other oxygen-rich gas and using a catalyst which is a cobalt, manganese or cerium salt, particularly a cobalt soap such as the toluate. In my process, the oxidation is carried out at a temperature within the range from 130–190° C., preferably within the range from about 140–155° C., and the oxidation is carried out to the extent that from 10 to 50 per cent, and preferably about 20 to 40 per cent, of the aromatics are converted or oxidized to oxygen-containing compounds. When the oxidation is carried out to this extent, approximately 5 to 15 per cent by weight of oxygen is absorbed by the reaction mixture, based upon the aromatics content thereof.

The optimum pressure employed is a function of the temperature of the oxidation and economic factors. In the absence of a solvent, the temperature of the oxidation controls the water content of the oxidation mixture at a given pressure, or conversely, at a given temperature, the working pressure should not exceed that which allows the majority of the water formed to be removed in the effluent gas stream. In addition, in the absence of a solvent, excess water is a catalyst poison in the oxidation reaction, possibly by removing the catalyst from the hydrocarbon layer. Generally, the reaction pressure should be within the range from about 50 to 500 p. s. i. g., and preferably within the range from about 100 to about 250 p. s. i. g. A pressure of 200 p. s. i. g. allows adequate water removal, gives an adequate oxidation rate and is economical of the materials of construction.

The following examples set forth in detail the process which I have invented, and are to be considered as by way of illustration only.

EXAMPLE I

Table I below sets forth the results obtained oxidizing meta-para xylene containing about 14 per cent of ethyl benzene in a reaction bomb with air in accordance with my process using as a catalyst 0.5 per cent of cobalt in the form of cobalt toluate, based upon the weight of the meta-para xylenes and ethyl benzene.

Table I

| Temp. | P. S. I. G. | Xylene Residence Time | Conv., Percent | Wt. Percent Yield | | |
|---|---|---|---|---|---|---|
| | | | | Total | Acids | Neutral |
| | | Min. | | | | |
| 150–160 | 500 | 30 | 41 | 115 | 94 | 21 |
| 155–165 | 500–200 | 37 | 31 | 119 | 76 | 43 |
| 145–155 | 500 | 33 | 38 | 116 | 80 | 36 |
| 140–150 | 500 | 33 | 43 | 117 | 73 | 43 |

The experimental work set forth in Table I was repeated using as a starting material ortho-meta-para xylene fraction isolated from petroleum and having the following analysis: ortho-xylene, 24.5 per cent; meta-xylene, 47 per cent; para-xylene, 17.5 per cent; and ethyl benzene, 11 per cent. In this experiment, the reaction temperature was 150° C., and the reaction pressure was 500 p. s. i. g. The oxidation was carried out to such an extent that 30 per cent of the aromatics were converted to oxygen-containing compounds. The weight per cent yield of acids was 87, and the weight per cent yield of neutrals was 36, based upon the weight of the charge.

EXAMPLE II

In this example continuous oxidation runs were made in the following manner: The xylene, catalyst and air in admixture with each other were charged to the bottom of the autoclave. It was found that unless a slight excess of toluic acid was present in the cobaltous toluate catalyst, the xylene-catalyst slurry was almost impossible to pump due to rapid settling of the catalyst and clogging of the feed lines. The exit line from the autoclave was positioned near the top of the autoclave and led to a condenser system, from the bottom of which the product was withdrawn. Table II which follows sets forth the operating conditions and the results obtained in these runs.

Table II

| Time, hours | Temp., °C. | Pressure, p. s. i. | Avr.[1] $O_2$ Util., percent | Avr.[2] $CO_2$ Eff., percent | Conv.,[3] percent | Yield[4], Wt. percent | Lbs. Toluic Acids Produced |
|---|---|---|---|---|---|---|---|
| 3.5 | 155 | 400 | 85 | 1.7 | 21 | 121 | 3.9 |
| 6.0 | 160 | 400 | 75 | 1.6 | 29 | 125 | 9.75 |

[1] Percent of oxygen in input air used in oxidation (volume percent).
[2] Carbon dioxide, volume percent in effluent gases from oxidation.
[3] Percent of xylenes charged which were not recovered.
[4] Weight of non-gaseous oxidation products isolated divided by weight of xylene not recovered.

EXAMPLE III

In the runs of this example, the equipment used comprised the following:

(1) A reactor section and air contactor,
(2) A cooling and heat transfer section,
(3) The product receiver and catalyst separation section, and
(4) A condenser section for stripping xylenes from the effluent gas stream.

The reactor section was constructed of type 316 stainless steel and consisted of a straight pipe, 3.3 inches in diameter and 20 inches long with flanges at each end. Liquid level was maintained to keep the reactor half full. Xylene-catalyst was charged at the top and withdrawn from the bottom. Air was charged at the bottom through a short ¼ inch standard pipe nipple of stainless steel, capped at the end and drilled with four holes ¹⁄₃₂ inch in diameter with each hole equidistant. Effluent gases were taken off the top of the reactor and passed to the condenser system. The entire reactor zone was jacketed with a water cooling unit. A thermocouple tube extending from the top of the reactor into the oxidation mixture made it possible to record and control the reaction temperature.

Catalyst and xylene were pumped to the reactor by means of a Hills-McCanna positive displacement pump. The catalyst was anhydrous cobaltous toluate prepared by pouring the hot molten catalyst into cold xylene, to give a finely dispersed phase with good flow characteristics in the xylene. Xylene-catalyst-product slurry was removed through a pipe at the bottom of the reactor, flowed upwards to a T located at the midpoint of the reactor to maintain liquid level and then flowed downward to a surge tank in the catalyst separation section. Flow characteristics of the xylene-catalyst-product slurry were satisfactory for continuous operation. Average xylene residence time in the reactor was 20 and 40 minutes.

In initial experiments, the reactor was operated at 200 p. s. i. g. with an air flow rate of 100 cubic feet per hour (metered at atmospheric pressure and room temperature). Calculated as flowing in an empty reactor, this gave an average air residence time of 35–40 seconds under reaction conditions. Preliminary observations of air flow in the xylene at atmospheric pressure indicated that this rate would probably be satisfactory. This was not found to be true under reaction conditions. Operation at this flow rate during xylene oxidation runs appeared to cause excessive bubbles or foam, raising the apparent liquid level and leaving no head space in the reactor. These conditions gave rise to poor heat transfer, decreased selectivity of the oxidation, and caused excessive deposition of solids on the heat transfer surfaces. All of these operational difficulties were reduced or eliminated by operating the unit at a lower air flow rate of 50 cubic feet per hour (NTP). This corresponds to an air residence time of 70–80 seconds. The oxygen utilization under either of these conditions was in the range of 95 per cent, indicating that the simple air distributor used was quite satisfactory and that mechanical agitation as in a stirred autoclave is not necessary. Agitation of the xylene reaction mixture by means of the input air was satisfactory under the conditions used. For the particular geometry of this reactor (diameter versus height) an air flow rate of 50 cubic feet per hour (NTP) appeared to be close to the maximum feasible.

Adequate design for the heat transfer section of a continuous xylene oxidation unit is critical for the successful operation of the unit, the crux of the problem being adequate cooling coupled with a minimum temperature differential between the reaction mixture and the cooling surface. In the experiments run, operation under the following conditions were satisfactory: reaction temperature. 150° C.; inlet cooling water temperature, 123° C.; and outlet water temperature, 128° C.

The essential design problem inherent in the cooling of the xylene oxidation mixture is the prevention of the deposition of solids from the oxidation mixture onto the heat transfer surfaces. This occurs as a function of the temperature differential between the reaction and the cooling surface and as a function of oxidation conditions.

The effluent product from the oxidation section consisted of unreacted xylenes, neutral oxidation products, toluic acids, cobaltic toluate, cobaltous toluate, and lesser amounts of other products such as phthalic acids, benzoic acid, and water. Hydrated cobaltous toluate is insoluble in the product, but cobaltic toluate is quite soluble and imparts a green color to the mixture. In order to make possible the removal of the catalyst by filtration, the catalyst in the cobaltic state of oxidation must be reduced to the cobaltous stage. The most economical and simple method for this step is to hold the oxidation product at a temperature of 130–150° C. for a suitable time to allow all of the cobaltic cobalt to be reduced. Operation of the surge or hold tank at 130° C. gave very rapid and complete catalyst conversion to the insoluble state. The time necessary for this conversion was in the range of five minutes or less. After blowing down the product to atmospheric pressure the catalyst was removed from the xylene solution by direct filtration.

The effluent gas stream contains unreacted xylene vapors, water, oxygen, carbon dioxide, carbon monoxide and nitrogen. The xylene vapors can be satisfactorily recovered by cooling the effluent gas stream to about 25° C. under the pressure conditions used in carrying out the oxidation.

Table III which follows sets forth the operational data obtained in making two runs in accordance with the procedure just described.

Table III

| Charge, gals. | Charge Stock | Time, hrs. | Conversion, percent | Yield [1] wt. percent | Percent of Yield as— | | |
|---|---|---|---|---|---|---|---|
| | | | | | Neutral | Toluic Acids | Residue (Tar) |
| 5 | Solvent B (III).[2] | 7.5 | 29 | 117 | 30 | 59 | 11 |
| 14 | Mixed Xylenes.[3] | 12 | 32 | 125 | 24 | 67 | 9 |

[1] The weight percent yield was determined by dividing the weight of oxidation products isolated by the weight of xylene (or Solvent B) not recovered.
[2] Solvent B (III) was a petroleum xylene fraction having an API gravity of 35.3 and having a boiling range closely approximating that of xylenes. It contained 82 percent by weight of aromatics and 2.2 percent by weight of olefins, the remainder being paraffins and naphthenes. The aromatics were mixed xylene isomers and about 10 percent of ethyl benzene, based on aromatics.
[3] The mixed xylenes used were essentially pure aromatics, principally mixed xylene isomers together with about 10 percent by weight of ethyl benzene, based upon the weight of the xylenes and ethyl benzene.

In oxidizing xylenes which are in admixture with relatively large amounts of paraffins and naphthenes and small amounts of olefins, as in the case of solvent B (III) above, I have found that the non-aromatic constituents are preferentially oxidized. I therefore contemplate recycling to the oxidation step the xylene-containing fraction separated from the effluent gases, since such fraction is a charge stock of enhanced value. The non-aromatic hydrocarbons are converted to a minor extent to carbon dioxide and water and to a greater extent to intermediate oxidation products. Part of the latter can be recovered by distillation in the form of useful products, and the remainder can be converted to non-distillable tars during the recovery of the toluic acids by distillation. The ultimate effect is, therefore, that part of the non-aromatics are wasted. This is not objectionable, however, since the cost of removing the non-aromatics in the preparation of xylene-rich fractions from petroleum is considerably greater than the loss incurred by including the non-aromatics in the oxidation charge stock.

The amount of neutral oxidation products (tolualdehydes, acetophenone, condensation products, and minor amounts of alcohols and esters) produced during the oxidation is a function of the degree of conversion. The amount of these products isolated decreases with increased conversion. At 40 per cent conversion, the amount of neutral products is in the range of 25 per cent of the total oxidation products. If isolation and independent sale of these products is not desired, they can be recycled to the oxidation reaction. Where neutral products are recycled to the oxidation, acetophenone present is oxidized to benzoic acid, which can be separated from the toluic acids by distillation.

In summary, my invention relates to an improved method for the preparation of toluic acids by the oxidation of xylenes. The material oxidized can be, in the first instance, the pure ortho-, meta- or para-xylene isomer. On the other hand, the material oxidized can be composed of any mixture of the aforementioned isomers, or the material oxidized can be composed of pure isomer, or a mixture of isomers, and relatively minor amounts of ethyl benzene, usually not exceeding about 16 per cent by weight of ethyl benzene and generally being within the range of from about 8 to about 16 per cent by weight of ethyl benzene, based upon the weight of the xylene or xylenes and ethyl benzene. Finally, the material oxidized can be composed essentially of a pure xylene isomer, a mixture of xylene isomers or the aforementioned mixture of ethyl benzene and a pure xylene or mixture of xylene isomers, together with up to about 30 per cent by weight of paraffins and/or naphthenes, generally from about 10 to about 30 per cent by weight, based upon the weight of the aforementioned aromatics and paraffin and/or naphthenes. The oxidation temperatures which I employ are within the range from 130° C. to 190° C., preferably 140° C. to 155° C., and the pressures which I employ are within the range from about 50 p. s. i. g. to 500 p. s. i. g., preferably 100 p. s. i. g. to 250 p. s. i. g. The oxidation is carried out by admixing air or other oxygen-rich gas with xylene or xylenes or other xylene-rich material just mentioned, no extraneous solvent material being introduced in the process in order that no solvent or solvent recovery cost will be incurred. The catalyst used is cobalt, manganese or cerium salt, preferably a soap such as cobalt toluate, which is at least partially soluble in the reaction mixture, the amount of catalyst not being critical although it does affect the reaction. From about 0.05 per cent to 0.5 per cent of catalyst, based on the metal content of the salt and the weight of the reaction mixture, is satisfactory. Among the catalysts which are useful, in addition to cobalt toluate, are cobalt naphthenates and cobalt stearates. The oxidation is carried out until from about 10 to about 50 per cent, preferably from about 20 to about 40 per cent, of the aromatic compounds initially present in the reaction mixture have been converted to oxygen-containing materials, approximately 5 to 15 per cent by weight of oxygen, based upon the aromatic content of the hydrocarbon oxidized, being absorbed by the reaction mixture when this is done. The toluic acids can be conveniently separated from the normally non-volatile reaction products by simple distillation, preferably vacuum distillation.

This application is a continuation-in-part of my co-pending application Serial No. 126,240, filed November 8, 1949, now abandoned, entitled "Production of Phthalic Acids."

I claim:

1. A method for the preparation of toluic acids from the corresponding xylenes which comprises oxidizing in liquid phase a material which consists essentially of such xylenes, up to about 16 per cent by weight of ethyl benzene, based upon the weight of the xylenes and ethyl benzene, and up to about 30 per cent by weight of paraffins and naphthenes, based upon the weight of the xylenes, ethyl benzene, paraffins and naphthenes, with an oxygen-rich gas at a temperature of 130° C. to 190° C., at a pressure of 100 p. s. i. g. to 500 p. s. i. g. and which does not exceed that which allows the majority of water formed to be removed as a gaseous effluent stream and using as a catalyst a salt which is soluble in the reaction mixture and which is selected from the group consisting of cobalt salts, manganese salts and cerium salts, the oxidation being carried out in the absence of an extraneous solvent and until from 10 to 50 per cent of the aromatic compounds initially present in the reaction mixture have been coverted to oxygen-containing compounds, and separating toluic acids from the reaction mixture.

2. A process as in claim 1 in which the oxidation temperature is within the range from about 140° C. to about 155° C., in which the pressure used is within the range from about 100 p. s. i. g. to 250 p. s. i. g., in which the catalyst used is a cobalt salt and in which the oxidation is carried out until from about 20 to about 40 per cent of the aromatic compounds initially present in the reaction mixture have been converted to oxygen-containing materials.

3. A process as in claim 1 in which said material consists essentially of xylenes, from about 8 to about 16 per cent by weight of ethyl benzene, based upon the weight of the xylenes, and from about 10 to about 30 per cent by weight of paraffins and naphthenes, based upon the weight of the xylenes, ethyl benzene, paraffins and naphthenes, and in which a xylene-rich fraction is isolated from the effluent products of oxidation and is returned to the reaction mixture.

4. A process as in claim 1 in which said material consists essentially of xylenes and from about 8% to about 16% by weight of ethyl benzene based upon the weight of the xylenes and ethyl benzene.

References Cited in the file of this patent

UNITED STATES PATENTS

| Number | Name | Date |
|---|---|---|
| 1,815,985 | Pansegrau | July 28, 1931 |
| 2,245,528 | Loder | June 10, 1941 |
| 2,531,173 | Toland | Nov. 21, 1950 |
| 2,552,278 | Hochwalt | May 8, 1951 |
| 2,644,840 | Roebuck | July 7, 1953 |

FOREIGN PATENTS

| Number | Country | Date |
|---|---|---|
| 63,987 | Netherlands | Aug. 15, 1949 |
| 623,836 | Great Britain | May 24, 1949 |
| 665,997 | Great Britain | Feb. 6, 1952 |
| 666,709 | Great Britain | Feb. 20, 1952 |